June 5, 1956 J. I. COPP 2,748,407
WEDGE FILLERS FOR SUSPENSION BRIDGE CABLES
Filed Dec. 26, 1951 2 Sheets-Sheet 1
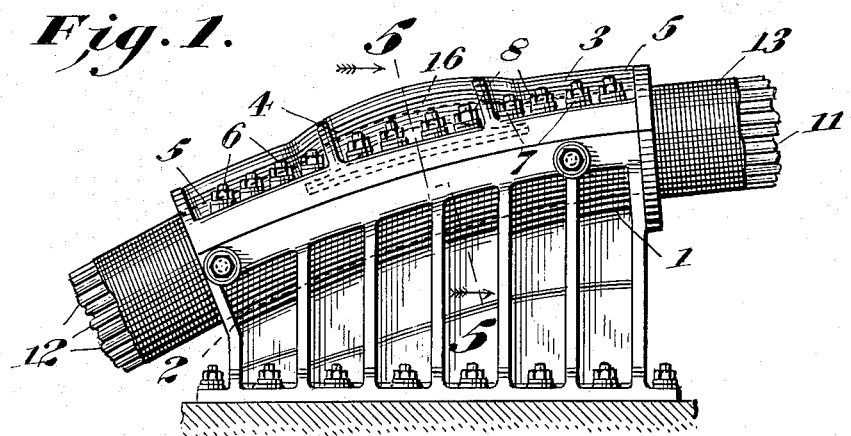
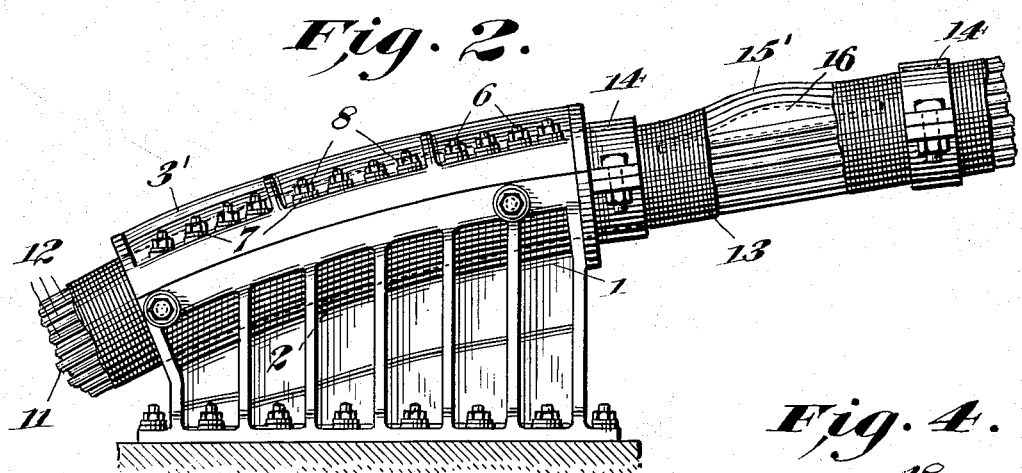
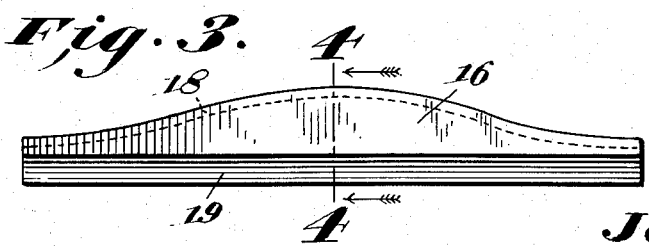
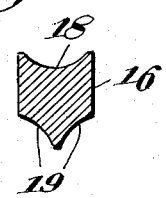
INVENTOR
John I. Copp.
BY R. S. A. Dougherty
ATTORNEY

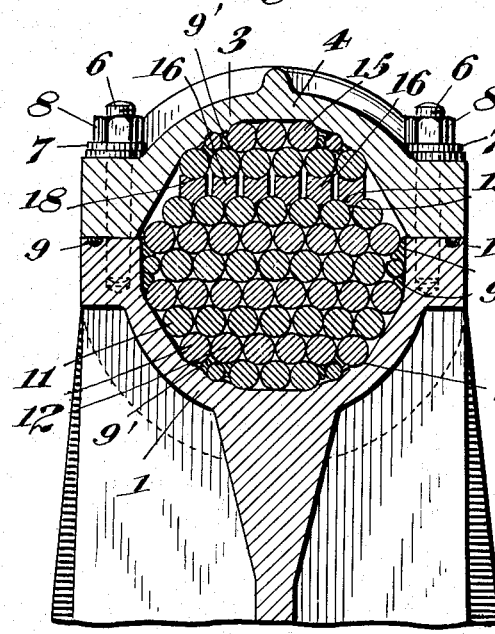

United States Patent Office 2,748,407
Patented June 5, 1956

2,748,407

WEDGE FILLERS FOR SUSPENSION BRIDGE CABLES

John I. Copp, Bethlehem, Pa., assignor to Bethlehem Steel Company, a corporation of Pennsylvania Application December 26, 1951, Serial No. 263,355

3 Claims. (Cl. 14—22)

My invention relates in general to suspension bridge safety devices, and more particularly to wedge fillers to prevent slippage of bridge cables through tower saddles or cable bands.

The main cables of suspension bridges are generally composed of bundles of parallel zinc-coated steel wires or strands of great strength, each such bundle being compacted in concentric layers of the wires or strands so as to function as a unit. In large bridges, it is obvious that the forces tending to slip the cables through the tower saddles and the bands along the cables are very great, and if not overcome successfully will sooner or later destroy the bridge.

The customary practice has been to depend entirely on the action of friction between the curved saddle (or the band) and the cable to prevent slippage. Such friction has been created by pressure obtained from clamping action of the saddle cover bolts, plus the weight of the cable on the bottom section of the saddle, with the resulting holding power being more or less variable and indeterminate.

One object of my invention, therefore, is to eliminate the necessity of such dependence on friction alone to prevent slippage.

Another object is to provide means to create a positive and dependable check against any possible cable slip.

Still other and further objects, purposes and advantages of my invention will appear hereinafter in the specification and drawings, and in the appended claims.

In the drawings:

Fig. 1 is a side elevation of a suspension bridge tower saddle which has an enlarged middle portion adapted for clamping an expanded section of parallel strand cable therein;

Fig. 2 is a side elevation similar to Fig. 1 but showing the expanded portion of the cable interposed between a pair of bands clamped thereon, with one of said bands abutting a saddle of uniform cylindrical bore;

Fig. 3 is a side elevation of an integral wedge filler adapted to be inserted between the strands of a cable to form a raised or expanded section thereof;

Fig. 4 is a vertical transverse section taken on the line 4—4 of Fig. 3;

Fig. 5 is a broken section taken on the line 5—5 of Fig. 1, and showing a row of parallel wedge fillers interposed between two layers of strands;

Fig. 6 is a section similar to Fig. 5, but showing built-up wedge fillers interposed between the layers of strands;

Fig. 7 is a side detail view showing the proper placement of the built-up wedge filler between the strands with the longest element uppermost, and smoothly curving to the desired taper under the pressure of the strands;

Fig. 8 is a bottom view of the built-up wedge filler before use; and

Fig. 9 is an inverted side view of the built-up wedge filler before use.

Referring to the individual parts which are designated by reference numerals, the curved saddle 1 comprises two parts, the lower or trough section 2 and an upper or cover section which latter may either be a substantially uniformly cylindrical cover section 3' as in Fig. 2, or a cover section 3 provided with a central enlargement or bulge 4 as in Fig. 1 with reduced end portions 5 having orifices of normal cable diameter. The upper and lower sections of the saddle 1 are securely fastened together by means of bolts 6, washers 7, and nuts 8, with the joint being sealed by a suitable caulking material 9 (such as tarred rope or the like) in edge recesses 10. The cable 11 consists of a plurality of strands 12, sixty-one strands being shown as typical in Figs. 5 and 6, with liners 9' of zinc or a like metal sealing interstices between outer strands, fitting closely within the saddle and tightly wound with wire servings 13 at each end of the saddle. The cable 11 may also be encircled by clamping bands 14, as shown in Fig. 2.

By spreading apart two or more layers of strand in the cable to produce a bulge 15 in the cable corresponding to the cover bulge 4 (Fig. 1), the resulting increase in diameter will prevent slipping of the cable by means of the wedge action of the increased cable diameter against the inner surfaces of saddle end portions 5 of normal cable diameter. With the cable bulge 15' positioned outside the saddle 1 but between a pair of clamping bands 14, as in Fig. 2, a similar wedge action preventing slippage of the cable through the bands will be caused.

Either the integral arcuate wedge fillers 16 (Figs. 3–5) or the built-up wedge fillers 17 (Figs. 6–9) may be employed to separate the layers of strand as above described. It will be noted that both types of fillers have their maximum heights in the center and taper gradually downward therefrom lengthwise to their opposite ends, so as to create an easement curve for the individual strands above the fillers which will avoid any possibility of kinking said strands when tightly clamped in position.

Due to the staggered relationship between strands of adjacent layers, each such wedge filler will lie directly beneath and supporting a single strand of one layer, while resting upon and being supported by a pair of strands of the subjacent layer.

The integral wedge fillers 16 are cast or otherwise formed of any suitable soft metal, such as zinc or aluminum, in substantially scutiform cross-section as shown in Fig. 4 to provide a single longitudinal top groove 18 and a pair of lower side grooves 19 in which the contacting strands will be received and will be further embedded by strand pressure to prevent slip with maximum effectiveness. In length, height and radius of curvature, the cast filler 16 must conform to the cable bulge 15 or 15', to which also must conform the corresponding dimension of the saddle cover bulge 4 or the space between the bands 14.

The built-up wedge fillers 17, however, are bent by the strand pressure to conform to the strand radius and the curve of the saddle, and are composed of packs of thin flat metal strips or laminations 20 of graduated lengths (six being shown), preferably of galvanized steel, with a plurality of cuts or serrations 21 forming small gripping teeth 23 on their side edges 24, the packs being temporarily tack-soldered together for convenience and fastened together centrally by a pair of rivets 22 after the manner of a multi-leaf spring. The laminations 20 will break loose from the tack-soldering when the pack has been put in place and curved to fit the curvature of the strands on which it bears, and the multiplicity of gripping teeth 23 formed on the side edges 24 by the multiplicity of serrations 21 will bend upward and spread apart under the pressure of the strands and thereby add to the frictional grip on the strands.

For purposes of illustration, the thickness of the wedge fillers of both types has necessarily been somewhat exaggerated in the drawings. In the built-up fillers 17, for example, the thickness of each of the laminations 20 (including the galvanizing) will be about .035 inch, so the maximum thickness of the six lamination filler shown will be of the order of .210 inch. The cast filler 16 will have about the same maximum thickness. The width of either type of wedge must correspond approximately to the diameter of the supported strand, as shown in Figs. 5 and 6.

Although I have thus described my invention hereinabove in considerable detail, I wish it to be understood that the present disclosure is intended to be illustrative, rather than restrictive, and that modifications, substitutions and equivalents may be resorted to without departing from the scope or spirit of the appended claims.

I claim:

1. A device for preventing cable slippage through a stationary annular member, comprising a plurality of stepped packs of thin metal strips with serrated edges, each pack being adapted to be positioned directly beneath and supporting a single cable strand while resting upon and being supported by a pair of subjacent cable strands and conforming thereto under the pressure of the strands, said serrated edges constituting a plurality of teeth adapted under said pressure of the strands to be spread apart and bent upward to grip the strands thereby increasing the outer diameter of the overlying portion of the cable to exceed the minimum inner diameter of the annular member and securely prevent slippage therethrough.

2. A device for preventing cable slippage comprising, in combination, a saddle having cooperating top and bottom cable-receiving sections, the said top section having a bulged portion intermediate its ends, flexible wedging means comprising packs of stepped serrated-edge laminations inserted between strand layers of a cable inside the bulged portion of the top section of the saddle, the serrated edges of the laminations being adapted to conform to the cable strands while providing an enlarged portion in the cable to fit tightly in the bulged portion, and means for clamping the top and bottom sections of the saddle together to grip the cable therebetween.

3. A wedge insert for a multi-strand cable comprising an elongated member tapered at both ends, said member consisting of a plurality of superimposed stepped laminations having serrated side edges, said serrated edges being adapted to conform to the curvature of the strands against which they are pressed by adjacent strands, and means located centrally of said member for securing said laminations together.

References Cited in the file of this patent

UNITED STATES PATENTS

| | | |
|---|---|---|
| 311,338 | Lindenthal | Jan. 27, 1885 |
| 378,697 | Lindenthal | Feb. 28, 1888 |
| 608,690 | Lindenthal | Aug. 9, 1898 |
| 1,051,226 | Heeter | Jan. 21, 1913 |
| 2,017,887 | Blackburn | Oct. 22, 1935 |

OTHER REFERENCES

Engineering News Record (January 14, 1932), page 47 relied on.